(12) United States Patent
Moreira et al.

(10) Patent No.: US 8,206,626 B2
(45) Date of Patent: Jun. 26, 2012

(54) METHOD FOR PRODUCING NANOPOROUS MOLDED PARTS

(75) Inventors: Andre Guerin Moreira, Ludwigshafen (DE); Marc Bothe, Limburgerhof (DE); Volker Schädler, Maikammer (DE); Markus Allmendinger, Edenkoben (DE); Pedro Manuel Sampaio Lopes, Leca do Balio (PT); Bernd Sowart, Bad Dürkheim (DE); Timothy Francis, St. Leon-Rot (DE); Erik Waßner, Mannheim (DE); Christian Schade, Ludwigshafen (DE); Daniela Longo, Siegburg (DE); Siljana Lietz, Bayreuth (DE); Volker Alstädt, Rosengarten (DE); Jan Sandler, Bayreuth (DE)

(73) Assignee: BASF SE, Aktiengesellschaft (DE)

( * ) Notice: Subject to any disclaimer, the term of this patent is extended or adjusted under 35 U.S.C. 154(b) by 54 days.

(21) Appl. No.: 12/307,179

(22) PCT Filed: Jun. 27, 2007

(86) PCT No.: PCT/EP2007/056408
§ 371 (c)(1),
(2), (4) Date: Oct. 19, 2009

(87) PCT Pub. No.: WO2008/003623
PCT Pub. Date: Jan. 10, 2008

(65) Prior Publication Data
US 2010/0025877 A1    Feb. 4, 2010

(30) Foreign Application Priority Data

Jul. 6, 2006 (EP) .................................. 06116713

(51) Int. Cl.
*C08J 9/00* (2006.01)
*B29C 44/34* (2006.01)

(52) U.S. Cl. ............... 264/50; 264/51; 264/53

(58) Field of Classification Search .............. 264/50, 264/51, 53
See application file for complete search history.

(56) References Cited

U.S. PATENT DOCUMENTS

| | | | |
|---|---|---|---|
| 4,152,495 A | 5/1979 | Labar | |
| 4,255,368 A * | 3/1981 | Olabisi | 264/45.5 |
| 5,180,751 A * | 1/1993 | Park et al. | 521/51 |
| 5,272,182 A | 12/1993 | Burnell | |
| 5,387,617 A | 2/1995 | Hedstrand et al. | |
| 2003/0022990 A1 | 1/2003 | Hirota et al. | |
| 2007/0173552 A1 | 7/2007 | Schadler et al. | |

FOREIGN PATENT DOCUMENTS

| | | |
|---|---|---|
| CA | 2148991 | 11/1995 |
| DE | 19710442 | 9/1998 |
| EP | 0682076 | 11/1995 |
| WO | WO-2005-049708 | 6/2005 |
| WO | WO-2005-092959 | 10/2005 |
| WO | WO-2005-095501 | 10/2005 |

OTHER PUBLICATIONS

International Preliminary Report on Patentability of International Application No. PCT/EP2007/056408 issued on Jan. 20, 2009.

* cited by examiner

*Primary Examiner* — Richard Crispino
*Assistant Examiner* — Robert Dye
(74) *Attorney, Agent, or Firm* — Connolly Bove Lodge & Hutz LLP

(57) ABSTRACT

Process for the production of moldings from nanoporous polymer materials, comprising the stages of
  a) preparation of a multiphase polymer mixture with domains in the range from 5 to 200 nm,
  b) impregnation of the polymer mixture with a blowing agent, where the solubility of the blowing agent in the phase forming the domains is at least twice as high as in the adjacent phases,
  c) expansion of the multiphase polymer mixture comprising blowing agent, by introducing the polymer mixture into a cavity and expanding it therein, thus obtaining the molding.

18 Claims, No Drawings

METHOD FOR PRODUCING NANOPOROUS MOLDED PARTS

CROSS REFERENCE TO RELATED APPLICATIONS

This application is a national phase of PCT/EP2007/056408, filed on Jun. 27, 2007, which claims priority to EP 06116713.6, filed on Jul. 6, 2006, the entire contents of which are incorporated herein by reference in their entireties.

The invention relates to a process for the production of moldings from nanoporous polymer materials, comprising the stages of
 a) preparation of a multiphase polymer mixture with domains in the range from 5 to 200 nm,
 b) impregnation of the polymer mixture with a blowing agent, where the solubility of the blowing agent in the phase forming the domains is at least twice as high as in the adjacent phases,
 c) expansion of the multiphase polymer mixture comprising blowing agent, by introducing the polymer mixture into a cavity and expanding it therein, thus obtaining the molding.

Moldings composed of nanoporous polymer materials—hereinafter referred to by the abbreviated term nanoporous moldings—have not only reduced thermal conductivity but also advantageous mechanical properties, when they are compared with conventional moldings composed of macroporous polymer materials. In particular, they exhibit relatively high toughness, and are consequently relatively resistant to impact, and they have better performance when subject to long-term dynamic stress, an example being less propagation of fatigue cracks.

WO 2005/092959 A1 describes inter alia processes for the production of nanoporous polymer foams, comprising the stages of
 a) preparation of a multiphase polymer mixture with domains in the range from 5 to 200 nm,
 b) impregnation of the polymer mixture with a blowing agent, where the solubility of the blowing agent in the phase forming the domains is at least twice as high as in the adjacent phases,
 c) expansion of the multiphase polymer mixture comprising blowing agent.

According to page 5, line 14 to page 6, line 3 of the description, stages a) and b) are undertaken in an extruder and the melt laden with blowing agent is extruded through a die to give foam sheets, foam strands, or foam particles, and is cut. As an alternative, the melt emerging from the die can be cut by means of underwater pelletization with a suitable counterpressure to give expandable or incipiently foamed particles. In order to produce moldings, the resultant particles have to be adhesive-bonded in a separate operation or fused by steam.

The production of moldings of any desired (including complicated) spatial shape in step c) immediately from the melt is not described.

It was an object to provide an improved process for the production of nanoporous moldings. The process should be capable of simple production of nanoporous moldings in a few steps. Even nanoporous moldings with a demanding spatial shape should be easy to produce.

A particular intention was to provide a process which can produce nanoporous moldings and which does not require adhesion or fusion of particles obtained separately. A further intention was that the process permit production of moldings directly from the melt.

The process was also intended to permit production of moldings with improved optical surface properties, in particular with higher surface gloss.

Accordingly, the process defined at the outset has been provided. Preferred embodiments of the invention are found in the subclaims. All of the stated pressures are absolute pressures.

In stage a), a multiphase polymer mixture with domains in the range from 5 to 200 nm is prepared. Domains in the range from 10 to 80 nm are preferred here. The size of the domains is preferably determined by means of transmission electron microscopy on thin layers and subsequent evaluation by image analysis.

From the sector of multiphase polymer systems, it is known that most polymers are mutually immiscible or have only low mutual miscibility (Flory), and demixing to give the respective phases therefore occurs as a function of temperature, pressure, and chemical constitution. If incompatible polymers are covalently linked to one another, the demixing takes place only at a microscopic level, i.e. the scale of the length of the individual polymer chain, and not at a macroscopic level. The term used in this case is therefore microphase separation. This gives a wide variety of mesoscopic structures, e.g. lamellar, hexagonal, cubic, gyroid and bicontinuous morphologies, these being closely related to lyotropic phases; see, for example, Hamley: The Physics of Blockcopolymers, Oxford University Press, Oxford 1998. There are moreover other possibilities of producing microphase separation in polymer melts, e.g. the introduction of particles composed of emulsion polymers.

In one preferred embodiment 1) of the inventive process the phase forming the domains is in essence composed of particles obtainable via emulsion polymerization. Core-shell particles are in particular involved here. The emulsion polymerization process is conventionally conducted, e.g. in water and with concomitant use of suitable emulsifiers and initiators. For the core-shell particles, the general method begins by preparing the core, and the shell monomers are then grafted onto this.

The particles are particularly preferably core-shell particles having a core composed of a polyacrylate or polymethacrylate, in particular composed of polymethyl methacrylate (PMMA). The particles are likewise particularly preferably core-shell particles having at least one shell composed of polystyrene or styrene-acrylonitrile copolymer. Other suitable particles are those having two or more shells, where the individual shells can by way of example be composed of polyacrylate, of polymethacrylate, of polystyrene, or of styrene copolymers (e.g. with acrylonitrile).

In another embodiment 2), the process is one wherein the phase forming the domains is in essence composed of block copolymers having incompatible blocks. Examples of these block copolymers are styrene-butadiene block copolymers or styrene-isoprene block copolymers. Two-block, three-block, or multiblock copolymers can be used, and the individual blocks of these can by way of example be homopolymers or random or tapered (gradient) copolymers. The structure of the block copolymers can by way of example be linear, comb-like, or star-shaped. Block copolymers of these types are known.

In both embodiments 1) and 2), the polymer mixture also comprises a thermoplastic polymer, preferably a styrene polymer, alongside the core-shell particles or the block copolymer. The term styrene polymer includes styrene homo- and copolymers, examples being standard polystyrene, impact-modified polystyrene—i.e. polystyrene comprising butadiene rubber or comprising isoprene rubber, and also includes copolymers of styrene-acrylonitrile (SAN) type, of acrylonitrile-butadiene-styrene (ABS) type, of acrylonitrile-styrene-acrylate (ASA) type, of styrene-maleic anhydride (SMA) type, and of styrene-methyl methacrylate (SMMA) type. The SMA polymers or SMMA polymers, too, can be impact-resistant (can comprise rubber). These polymers are known and commercially available.

In both embodiments 1) and 2), the polymer mixture preferably comprises from 20 to 99.99% by weight, in particular from 50 to 99.9% by weight, and particularly preferably from 80 to 99.5% by weight, of a styrene polymer.

It is likewise preferable that the polymer mixture in embodiment 1) comprises from 0.01 to 40% by weight, in particular from 0.1 to 20% by weight, preferably from 0.3 to 10% by weight, and particularly preferably from 0.5 to 5% by weight, of the core-shell particles. It is also preferable that the polymer mixture in embodiment 2) comprises from 0.01 to 40% by weight, in particular from 0.1 to 20% by weight, preferably from 0.3 to 10% by weight, and particularly preferably from 0.5 to 5% by weight, of the block copolymers having incompatible blocks.

The % by weight making up 100% by weight in the above embodiments 1) and 2) is conventional additives which may optionally be used concomitantly. Suitable additives inter alia are, these being known to the person skilled in the art, nucleating agents, plasticizers, flame retardants, soluble and insoluble inorganic and, respectively, organic dyes and pigments, fillers, or antistatic agents. Their amounts added, if appropriate, are such as not to impair domain formation and resultant nanopores. The additives can be added in stage a) and/or in stage b) of the process.

In stage b), the polymer mixture is impregnated with a blowing agent, where the solubility of the blowing agent in the phase forming the domains is at least twice as high as in the adjacent phases.

A significant factor is the non-homogeneous distribution of the blowing agent in the multiphase polymer mixture. Formed by segregated mesoscopic nano-scale regions. These domains have higher sorption capability with regard to the blowing agent than the surrounding matrix. By way of example, in an A-B diblock copolymer where the blowing agent has markedly higher solubility in relation to the block A than in relation to the block B, in the equilibrium state, there are domains with markedly different concentration of blowing agent. The spatial extent of the regions with different blowing agent concentration corresponds precisely to the linear scale of microphase separation of the block copolymer, i.e. typically being in the range from about 10 to 200 nm, as long as the domains do not become enlarged through absorption of the blowing agent.

The solubility of the blowing agent in the phase forming the domains relative to the solubility in the adjacent phase is preferably based on a temperature of 60° C. and atmospheric pressure.

The solubility is preferably measured in an magnetic floating balance apparatus which can determine the solubility of the blowing agent in the polymer gravimetrically as a function of the pressure and of the temperature. Apparatuses and methods of this type are known to the person skilled in the art.

Similar considerations generally also apply to the emulsion polymer particles mentioned: the blowing agent sorption capability and therefore the concentration of the blowing agent in the particles (in particular in the core in the case of core-shell particles) differs markedly from the blowing agent sorption capability of the matrix.

If this type of microphase-separated polymer mixture provided with a selective blowing agent is expanded, for example via heating, the non-homogeneous distribution of the blowing agent means that bubble formation preferably takes place in those microphases which have higher blowing agent concentration. If, for example, the material selected comprises a block polymer or an appropriate mixture composed of a block copolymer and of a homopolymer which comprises isolated spherical domains, the theoretical nucleation number in the porous material is a function of the density of the microdomains.

The blowing agents are therefore selected as appropriate for the solubility of the polymers or polymer segments of the multiphase polymer mixture. The blowing agent has preferably been selected from hydrocarbons, water, alcohols, ketones, ethers, alkyl esters and alkylamides.

The blowing agent can be volatile, for example can have a boiling point below 120° C. at 1013 mbar. These volatile blowing agents generally volatilize to some extend or entirely either during production of the molding or out of the finished molding. However, low-volatility blowing agents are also suitable, these usually remaining at least to some extent in the molding. Examples of low-volatility blowing agents that are suitable are also oligomeric or polymeric substances which are selectively miscible with the desired phase.

By way of example, mention may be made of the following agents: suitable hydrocarbons are low-molecular-weight $C_{2-8}$ hydrocarbons, mineral oils, in particular those whose dynamic viscosity at 25° C. is more than 50 mPa·s (to ASTM D445), or hydrocarbon waxes whose softening point is at most 130° C.

Alcohols that can be used are methanol, ethanol, n-propanol, isopropanol, glycerol, phenols, and fatty acid alkoxylates and fatty acid propoxylates, preferably methanol and ethanol. Suitable ketones are acetone or methyl ethyl ketone. Suitable ethers are polyethylene glycols, polypropylene glycols or ethylene oxide-propylene oxide block copolymers.

Examples of suitable alkyl esters are methyl and ethyl acetate, phthalic esters, adipic esters, and 1,2-cyclohexanedicarboxylic esters. Suitable alkylamides are stearylamide, behenylamide, N,N-bisstearylamide and N,N'-bisethylenediamine-stearamide. Blowing agent mixtures can, of course, also be used.

In the case of a polymer mixture which is composed of polystyrene and of a phase forming polar domains, for example of acrylate or methacrylate, it is preferable to use an alcohol, such as ethanol or methanol.

The amount of the blowing agent is, for example, from 0.01 to 20% by weight, preferably from 0.1 to 15% by weight and particularly preferably from 0.5 to 10% by weight, based on the multiphase polymer mixture from stage a).

In addition to the blowing agent, a co-blowing agent can be used concomitantly. This optional co-blowing agent has preferably been selected from carbon dioxide, nitrogen, fluorocarbons, and noble gases. $CO_2$ and $N_2$, in particular $N_2$, are particularly preferred.

If concomitant use is made of a co-blowing agent, its amount is usually from 0.01 to 20% by weight, preferably from 0.1 to 10% by weight, and in particular from 1 to 8% by weight, based on the phase polymer mixture from stage a).

Blowing agent and co-blowing agent can be added separately from one another or in the form of a mixture. Particular preference is given to methanol or ethanol as blowing agent and $N_2$ as co-blowing agent. Low-volatility blowing agents and $N_2$ are also particularly preferred. It is particularly preferable that the blowing agents are selected in such a manner that they are organoleptically not noticeable and have official approval for food-and-drink applications.

The multiphase polymer mixture comprising blowing agent and obtained in stage b) is generally (molten or) liquid. The multiphase polymer mixture comprising blowing agent and obtained in stage b) is preferably flowable.

In stage c) this multiphase polymer mixture comprising blowing agent is expanded. Here, the polymer mixture is introduced into a cavity, preferably an injection mold, and expanded therein, thus giving the molding. Among moldings are also semifinished products, such as pipes, rods, profiles and sheets and in particular moldings which are not obtainable in the form of "continuous" semifinished product via continuous extrusion and continuous haul-off.

The cavity is formed via a mold, preferably an injection mold, and it is usual here that the spatial shape of the cavity of the mold corresponds to the desired molding.

During the injection and shaping process, the polymer mixture is kept at a pressure and a temperature such that the blowing agent and/or the co-blowing agent escape(s) at a selected juncture, thus permitting expansion of the polymer mixture. The mixture solidifies here to give the finished nanoporous molding. The mold is then opened and the molding is removed.

In one preferred embodiment of the process of the invention, during injection into the mold, the polymer mixture is kept at a pressure and a temperature such that the polymer mixture expands at least to some extent during injection into the mold.

In another preferred embodiment of the process of the invention, the cavity is subjected to a counterpressure (p) of at least 1.1 bar prior to introduction of the polymer mixture. A preferred result of establishment of an increased pressure in the cavity is substantial suppression of expansion during injection into the mold. Expansion of the polymer mixture then takes place through controlled reduction of the increased pressure in the polymer mixture. The counterpressure p mentioned is in particular at least 5 bar, particularly preferably at least 10 bar. The pressure p is likewise preferably at most 1000 bar, preferably 500 bar, and particularly preferably 200 bar.

The pressure in the cavity acts as counterpressure against which the inflowing polymer mixture cannot expand, and this means that expansion is controlled via a subsequent reduction of pressure in the polymer mixture. Stage c) is preferably designed in such a way that, after the expansion process, the cavity has been completely filled with the porous polymer.

The pressure in the polymer mixture is preferably reduced as a function of the flowability of the polymer mixture, of its blowing agent content, and of the level of fill of the mold. The pressure drop can be continuous, e.g. linear or exponential, or discontinuous (staged). The usual method reduces the pressure as far as ambient pressure (e.g. 1013 mbar). The controlled pressure drop can be used to control the density and the pore size of the moldings. Density and pore size of the moldings are moreover affected by other parameters, such as the injection rate.

The controlled pressure reduction in the polymer mixture for the expansion process takes place using conventional apparatuses with which the mold has been provided and which are intended for pressure control, examples being compressed-air feed, pressure-control valves, air-extraction equipment, or volume enlargement through the use of moveable elements, or movement of one or both mold halves, or the level of injection pressure and hold pressure of the injection-molding machine. As a function of the size and spatial shape of the cavity, the mold can be a two- or multipart mold, and can have one or more inlet aperture (gates) for the polymer mixture. It can be advisable to permit the molding to harden or age for a certain further time at constant or variable mold temperature in the closed mold before the mold is opened and the molding is removed. The flow paths in the mold are preferably designed with temperature control (hot-runner technology).

The inventive process can be carried out on equipment known per se. To prepare the multiphase polymer mixture (stage a)) it is preferable to use the mixers or kneaders conventional in polymer processing. Preference is given to extruders with, for example, one or two screws. The polymer mixture can be further processed as it stands, or can be added in the form of what is known as a masterbatch to other polymers.

The temperature in stage a) depends inter alia on the polymer mixture and is by way of example from 150 to 350° C., in particular from 180 to 300° C. The pressure in stage a) is usually from 1 to 1000 bar, preferably from 1.5 to 500 bar.

The impregnation with the blowing agent (stage b)) can by way of example likewise take place in a single- or twin-screw extruder. In order to facilitate incorporation of the blowing agent by mixing, the extruder can be provided with conventional mixing elements, such as specific screw sections with high shear action or with high dispersing action (inter alia kneading blocks, retarding disks, reverse-conveying elements, screw diameter change, screw flight number change, or screw pitch change) or with static mixers. These extruder configurations are known to the person skilled in the art.

The temperature in stage b) depends inter alia on the polymer mixture and on the blowing agent and by way of example is from 100 to 300° C., in particular from 120 to 280° C. The pressure in stage b) can by way of example be from 1 to 1000 bar, preferably from 2 to 500 bar.

Stages a) and b) can be carried out in separate extruders, or preferably in a single extruder.

The polymer mixture comprising blowing agent and leaving the extruder after stage b) can then be transferred to equipment for producing a molding, an example being an injection-molding machine. This transfer usually takes place under a pressure which is sufficient to avoid premature expansion of the mixture.

According to one preferred embodiment, the polymer mixture is introduced in flowable form into the cavity. For the purposes of the process of the invention, the cavity is preferably an injection mold.

In one particularly preferred embodiment, at least the stages b) and c) take place in an injection-molding machine. This means that the blowing agent is fed into the injection-molding machine immediately ("direct gas incorporation"). Less volatile blowing agents can also be added before stage a) is complete. In these cases, it is advantageous to add the co-blowing agent in stage b). The blowing agent and/or the co-blowing agent can by way of example be metered into the plastifying unit or can be metered during the injection process by way of a fluid injection nozzle.

To improve incorporation of the blowing agent by mixing, the injection-molding machine may have been provided, in particular in the region of metering-in of the blowing agent or downstream, with the mixing elements described above for the extruder.

The term injection-molding machine here preferably comprises at least the elements of plastifying unit, in which the molding composition is plastified, and an injection mold, which is a mold into which the flowable molding composition is injected.

It is also possible to begin by preparing a masterbatch from the thermoplastic polymer, e.g. styrene polymer, and from the phase forming the domains, for example emulsion polymer particles (above embodiment 1)) or block copolymers with incompatible blocks (above embodiment 2)), and to blend this masterbatch in the injection-molding machine with further thermoplastic polymer to give the finished polymer mixture. It is preferable here that the blowing agent is added as part of preparation of the masterbatch and that the co-blowing agent—if it is used concomitantly—is added in the injection-molding machine.

The cycle time of the injection-molding machine (injection, hold pressure time, demolding) can be varied widely as a function of the size and shape of the molding, the design of the mold, and the expansion and solidification behavior of the polymer mixture, being by way of example from 0.5 sec to 4 min, preferably from 1 sec to 1 min.

The average pore diameter of the nanoporous polymer material of which the moldings are composed is preferably from 100 to 8000 nm. It is particularly preferably from 250 to 5000 nm, in particular from 300 to 2500 nm. It is very particularly preferable that the average pore diameter of the nanoporous polymer material of which the moldings are composed is from 100 to 1000 nm. All of the average values stated are number averages, unless otherwise indicated.

The average pore diameter of the nanoporous polymer materials is preferably determined by measurements on electron micrographs of the porous polymer material, using a scanning electron microscope, and subsequent evaluation by image analysis, using at least 200 individual pores, and determination of the number average.

It is likewise preferable that the density of the nanoporous polymer material of which the moldings are composed is from 300 to 1000 g/ml. The density is in particular from 350 to 900 g/l, particularly preferably from 400 to 750 g/l.

The inventive process can produce nanoporous moldings with low pore diameter. The moldings have low thermal conductivity and are therefore suitable inter alia for thermal insulation in the construction industry, in refrigerators and freezers, including freezer chests, or in vehicles.

The moldings preferably exhibit at least one of the following properties when compared with identical moldings of the same density which have no nanopores:
the toughness of the moldings has been improved, for example on impact,
the ductility of the moldings has been improved, for example when subjected to tensile or compressive stress,
markedly fewer fatigue cracks occur in the moldings when subjected to long-term dynamic stress,
the surface gloss of the moldings is higher.

Example—Determination of methanol absorption of polystyrene and of domains in the range from 5 to 200 nm comprising polystyrene.

Adsorption of methanol was determined at 60° C. and atmospheric pressure, by determining the absorption of methanol in the polymer material in % by weight as a function of time during a period of 100 days. The solubility of methanol in the phase forming domains is determined via comparison with the solubility in the material of the adjacent phase (matrix material) without domains.

| Polymer material used | Methanol absorption after 20 days in % by weight, based on polymer material used | Methanol absorption after 57 days in % by weight, based on polymer material used | Methanol absorption after 97 days in % by weight, based on polymer material used |
|---|---|---|---|
| Polystyrene | 3.2 | 3.6 | 3.9 |
| Polystyrene with 16.7% by weight of core-shell particles | 11.7 | 23 | 32.8 |

The polystyrene used comprised GPPS (general purpose polystyrene) whose weight-average molar mass is 200 000 g/mol and whose melt volume rate MVR [200° C./5 kg] to ISO 1133 is 9.15 ml/10 min. For preparation of the multiphase polymer mixture with core-shell particles, a first stage reacted 50% by weight of methyl methacrylate (MMA) and a second stage reacted 50% by weight of styrene with 9.5 pphm of arylsulfonate and 0.5 pphm of Dowfax 2A1 as emulsifier in an emulsion polymerization reaction. The first stage here comprised 1% by weight of crosslinking agent (allyl methacrylate), based on the weight of the first stage. The average diameter of the PMMA particles after the first stage was 49 nm. The average diameter of the PMMA particles with polystyrene shell (core-shell particles) after the second stage was 61 nm. The average diameters were determined in each case by dynamic light scattering. The core-shell particles were then mixed with polystyrene in the stated ratio by weight in an extruder.

The methanol absorption of the core-shell particles after 97 days, according to the values in the table, was 178% by weight, based on the original weight of the core-shell particles, whereas methanol absorption in the matrix material (polystyrene) in the same period was only 3.9% by weight.

The inventive process permits simple production of nanoporous moldings in a few steps. By way of example, the process can be operated entirely automatically on an injection-molding machine, thus permitting production of large numbers of a molding in a short time at low cost. The inventive process is also capable of problem-free production of moldings with very complicated geometry, thus differing from extrusion processes for continuous semifinished products (e.g. continuous pipes, continuous rods, continuous profiles, continuous webs, continuous sheets).

The invention claimed is:
1. A process for the production of moldings from nanoporous polymer materials, comprising the stages of
a) preparation of a multiphase polymer mixture with domains in the range from 5 to 200 nm,
b) impregnation of the polymer mixture with a blowing agent, where the solubility of the blowing agent in the phase forming the domains is at least twice as high as in the adjacent phases,
c) expansion of the multiphase polymer mixture comprising blowing agent, by introducing the polymer mixture into a cavity and expanding it therein, thus obtaining the molding; wherein the average pore diameter of the nan- oporous polymer material is from 100 to 8000 nm and the density of the nanoporous polymer material is from 300 to 1000 g/l.

2. The process according to claim 1, wherein the polymer mixture is introduced in flowable form into the cavity.

3. The process according to claim 2, where the cavity is an injection mold.

4. The process according to claims 2, wherein at least stages b) and c) take place in an injection-molding machine.

5. The process according to claims 2, wherein, prior to introduction of the polymer mixture, the cavity is subjected to a pressure of at least 1.1 bar, and the expansion of the polymer mixture takes place via controlled reduction of this pressure.

6. The process according to claim 1, wherein the cavity is an injection mold.

7. The process according to claims 6, wherein at least stages b) and c) take place in an injection-molding machine.

8. The process according to claims 6, wherein, prior to introduction of the polymer mixture, the cavity is subjected to a pressure of at least 1.1 bar, and the expansion of the polymer mixture takes place via controlled reduction of this pressure.

9. The process according to claim 1, wherein at least stages b) and c) take place in an injection-molding machine.

10. The process according to claims 9, wherein, prior to introduction of the polymer mixture, the cavity is subjected to a pressure of at least 1.1 bar, and the expansion of the polymer mixture takes place via controlled reduction of this pressure.

11. The process according to claim 1, wherein, prior to introduction of the polymer mixture, the cavity is subjected to a pressure of at least 1.1 bar, and the expansion of the polymer mixture takes place via controlled reduction of this pressure.

12. The process according to claim 1, wherein the phase forming domains consists essentially of core-shell particles obtainable via emulsion polymerization.

13. The process according to claim 12, wherein the particles are core-shell particles with a core composed of a polyacrylate or polymethacrylate.

14. The process according to claim 12, wherein the particles are core-shell particles with at least one shell composed of polystyrene or styrene-acrylonitrile copolymer.

15. The process according to claim 1 wherein the phase forming the domains is in essence composed of block copolymers having incompatible blocks.

16. The process according to claim 1, wherein the polymer mixture comprises from 20 to 99.99% by weight of a styrene polymer.

17. The process according to claim 1, wherein the blowing agent has been selected from hydrocarbons, water, alcohols, ketones, ethers, alkyl esters and alkylamides.

18. The process according to claim 1, wherein a co-blowing agent is used concomitantly and has been selected from carbon dioxide, nitrogen, fluorocarbons and noble gases.

* * * * *